US007089098B2

(12) United States Patent
Rogg et al.

(10) Patent No.: US 7,089,098 B2
(45) Date of Patent: Aug. 8, 2006

(54) INDUSTRIAL TRUCK HAVING AN INTERFACE FOR DIAGNOSTIC DATA

(75) Inventors: Andreas Rogg, Lübeck (DE); Frank Mänken, Henstedt-Ulzburg (DE)

(73) Assignee: Jungheinrich AG, Hamburg (DE)

( * ) Notice: Subject to any disclaimer, the term of this patent is extended or adjusted under 35 U.S.C. 154(b) by 97 days.

(21) Appl. No.: 10/268,866

(22) Filed: Oct. 10, 2002

(65) Prior Publication Data

US 2003/0074118 A1   Apr. 17, 2003

(30) Foreign Application Priority Data

Oct. 12, 2001   (DE) ................................ 101 50 631

(51) Int. Cl.
*G06F 19/00* (2006.01)
*G06F 7/00* (2006.01)
*G01M 17/00* (2006.01)

(52) U.S. Cl. .......................... 701/31; 701/51; 340/438; 340/439

(58) Field of Classification Search ................. 701/31, 701/36, 1, 29, 50, 51, 35, 33; 340/438, 425.5, 340/431, 439; 600/300; G06F 19/00, 7/00
See application file for complete search history.

(56) References Cited

U.S. PATENT DOCUMENTS

| | | | | |
|---|---|---|---|---|
| 4,829,554 A | * | 5/1989 | Barnes et al. ............. 455/432.1 |
| 4,853,850 A | * | 8/1989 | Krass et al. ................... 107/35 |
| 5,555,498 A | * | 9/1996 | Berra et al. .................... 701/33 |
| 5,657,224 A | * | 8/1997 | Lonn et al. .................... 701/29 |
| 5,737,711 A | * | 4/1998 | Abe ............................. 701/29 |
| 5,790,965 A | * | 8/1998 | Abe ............................. 701/29 |
| 6,181,992 B1 | * | 1/2001 | Gurne et al. ................... 701/29 |
| 6,254,201 B1 | * | 7/2001 | Lesesky et al. ........ 303/122.02 |
| 6,378,959 B1 | * | 4/2002 | Lesesky et al. ........ 303/122.02 |
| 6,434,455 B1 | * | 8/2002 | Snow et al. ................... 701/33 |
| 6,526,340 B1 | * | 2/2003 | Reul et al. ..................... 701/29 |
| 6,529,808 B1 | * | 3/2003 | Diem ........................... 701/29 |

(Continued)

FOREIGN PATENT DOCUMENTS

DE    100 15 009 A1   10/2001

(Continued)

OTHER PUBLICATIONS

Unknown author, Resolution #93-40, State of California Air Resources Board, Amendments to regulations regarding on-board diagnostic system requirements for 1994 and later passenger cars, light-duty trucks, and medium-duty vehicles and engines (OBD-11), Jul. 1993.*

*Primary Examiner*—Cuong Nguyen
(74) *Attorney, Agent, or Firm*—Faegre & Benson, LLP

(57) ABSTRACT

An industrial truck having a first and a second controller, each of which has an apparatus for a self-diagnosis of sensors and actuators of the controller, including one or more data lines between the first and the second controller for a transmission of operating and diagnostic data of the controllers wherein the operating and diagnostic data are transmitted on one or more interfaces with a common protocol, and a translation device for diagnostic data of the first controller for an interface of the second controller to which the diagnostic data of the second controller is applied, wherein the translation device translates the diagnostic data of the first controller into the same protocol in which the diagnostic data of the second controller is applied to the interface and both the interface and protocol are suited for exchanging diagnostic and operating data to communicate with additional controllers.

29 Claims, 3 Drawing Sheets

U.S. PATENT DOCUMENTS

| | | | |
|---|---|---|---|
| 6,582,033 B1* | 6/2003 | Lesesky et al. | 303/122.02 |
| 6,603,394 B1* | 8/2003 | Raichle et al. | 340/438 |
| 6,622,070 B1* | 9/2003 | Wacker et al. | 701/29 |
| 6,636,790 B1* | 10/2003 | Lightner et al. | 701/33 |
| 6,799,814 B1* | 10/2004 | Lesesky et al. | 303/122.02 |
| 6,819,986 B1* | 11/2004 | Hong et al. | 701/29 |
| 2001/0040408 A1* | 11/2001 | Lesesky et al. | 303/122.02 |
| 2002/0007237 A1* | 1/2002 | Phung et al. | 701/33 |
| 2002/0030403 A1* | 3/2002 | Lesesky et al. | 303/122.02 |
| 2002/0070851 A1* | 6/2002 | Raichle et al. | 340/438 |
| 2002/0077711 A1* | 6/2002 | Nixon et al. | 700/51 |
| 2002/0173885 A1* | 11/2002 | Lowrey et al. | 701/29 |
| 2003/0060949 A1* | 3/2003 | Letang et al. | 701/29 |
| 2003/0193240 A1* | 10/2003 | Lesesky et al. | 303/123 |
| 2003/0221118 A1* | 11/2003 | Walker | 713/193 |
| 2005/0007249 A1* | 1/2005 | Eryurek et al. | 340/511 |
| 2005/0040701 A1* | 2/2005 | Lesesky et al. | 303/122.02 |

FOREIGN PATENT DOCUMENTS

DE    10150631 A1 *  4/2003

* cited by examiner

INDUSTRIAL TRUCK HAVING AN INTERFACE FOR DIAGNOSTIC DATA

CROSS REFERENCE TO RELATED APPLICATION

Priority is claimed to German patent application Ser. no. 101 50 631.7, filed Oct. 12, 2001 and having the title AN INDUSTRIAL TRUCK HAVING AN INTERFACE FOR DIAGNOSTIC DATA.

BACKGROUND OF THE INVENTION

The invention relates to an industrial truck having a first and a second controller each of which has an apparatus for a self-diagnosis of sensors and actuators of the controller. Industrial trucks frequently have provided therein several electric controllers to control the transmission unit, hydraulic equipment, and combustion engine, for example.

The electronic control unit of a combustion engine comprises several sensors such as those for the crankshaft speed, the temperature in the intake pipe, the air volume which is drawn in, the pressure on the throttle valve, and the like. The electronic control unit of the combustion engine additionally has a plurality of actuators such as an injection volume regulator, electrovalves to return exhaust gas, and the like. To process the sensor values sensed and energize the actuators, a control unit is provided which processes the sensor signals and outputs setpoints for the control variables to the actuators. The electronic control unit is provided with an apparatus for a self-diagnosis of the system, and signal levels are monitored, for example, to detect a cable break. Also, the sensor values sensed may be compared to modelled sensor values to establish any erroneous function. Erroneous functions or deviations which are recognized are deposited in an error memory of the controller. Individual functions of self-diagnosis may also be initiated by external diagnostic apparatuses which are connected via an appropriate interface. In this case, the erroneous functions deposited in the error memory may be read out and the checking sequences may be released in the controller in question. The diagnostic apparatus evaluates the data read from the error memory and translates them into messages or instructions for the maintenance of the industrial truck.

Now, if a plurality of controllers having different interfaces are provided in industrial trucks it is necessary to provide each controller with a separate diagnostic apparatus which reads data from the error memory and processes them further. Employing a plurality of diagnostic apparatuses has proved to be troublesome and to involve an expenditure. What adds to this is that every diagnostic apparatus is capable of performing a diagnosis only by means of a single controller and will not carry out an overall diagnosis of the industrial truck that takes into account data from more than one controller.

It is the object of the invention to provide an industrial truck which can be diagnosed by means of a diagnostic apparatus in a simple and complete way and processes the diagnostic data in the controllers, thus preventing component overloads.

OBJECTS OF THE INVENTION

The object is attained by an industrial truck having the features of the present invention. The inventive industrial truck has a first and a second controller each of which is equipped with a device for a self-diagnosis of its sensors and actuators. One or more data lines interconnect the first and the second controller for a transmission of operating and diagnostic data of the controllers. The exchange of data may be performed here in a way which has been known already, e.g. as a CAN communication. The second controller has a translation device which translates the diagnostic data of the first controller for an interface of the second controller. This causes the diagnostic data of the first controller to be translated into the same protocol in which the diagnostic data of the second controller exist. The interface need not necessarily be integrated in the second controller, but is logically associated therewith to the effect that the diagnostic data of the second controller need to be translated before being outputted. The translation device and the interface of the second controller make it possible to read diagnostic data of the first controller from the second controller. What adds to this is that diagnostic data of the second controller may also be read out at the interface so that the second controller has a terminal at which diagnostic data of both the first and second controllers may be read out in a common protocol. The common protocol also allows to transmit operating and diagnostic data of further controllers.

It is preferred that the interface of the second controller be provided as a CAN interface. The data line between the first and second controllers is also designed to exchange data with each other via two interfaces. The first interface may be provided for operating data here whereas the second interface is provided for diagnostic data.

The translation device is equipped with a processor which translates the diagnostic data of the first controller into error codes for the interface of the second controller. Optionally, the translation device may also take into account diagnostic data of the second controller and, as an alternative, an analysis may be made for all of the diagnostic data in the diagnostic apparatus.

It is also possible to provide the industrial truck with additional controllers which, in turn, are in communication with the interfaces of the second controller via data lines and which exchange operating and diagnostic data so that each controller of the industrial truck may make use of the diagnostic data of the remaining controllers that will be taken into account, if required. Translation devices are provided for the additional controllers and will translate the diagnostic data of the controllers for the interface of the second controller. The exchange of diagnostic data makes it possible to take into account diagnostic data of a controller in forming the setpoint of another controller.

The common interface of the second controller is also designed as an aid to read in data for the controllers with the respective translation device translating them into the protocol of the first controller and routing them on to it. In an advantageous aspect, the interface of the second controller is provided with a transmission and reception unit which is adapted to transmit and receive diagnostic data.

A diagnostic apparatus associated with the industrial truck reads out the diagnostic data of all controllers via the interface of the second controller and subjects them to further processing. Here, the connection to the interface may also be provided via a transmission and reception unit which is adapted to receive data transmitted from the interface of the controller, and to transmit data thereto. Transmission and reception may be accomplished by radio or via an ISDN line, for example.

The invention will now be described in more detail with reference to the examples which follow.

DETAILED DESCRIPTION

Figure 1:
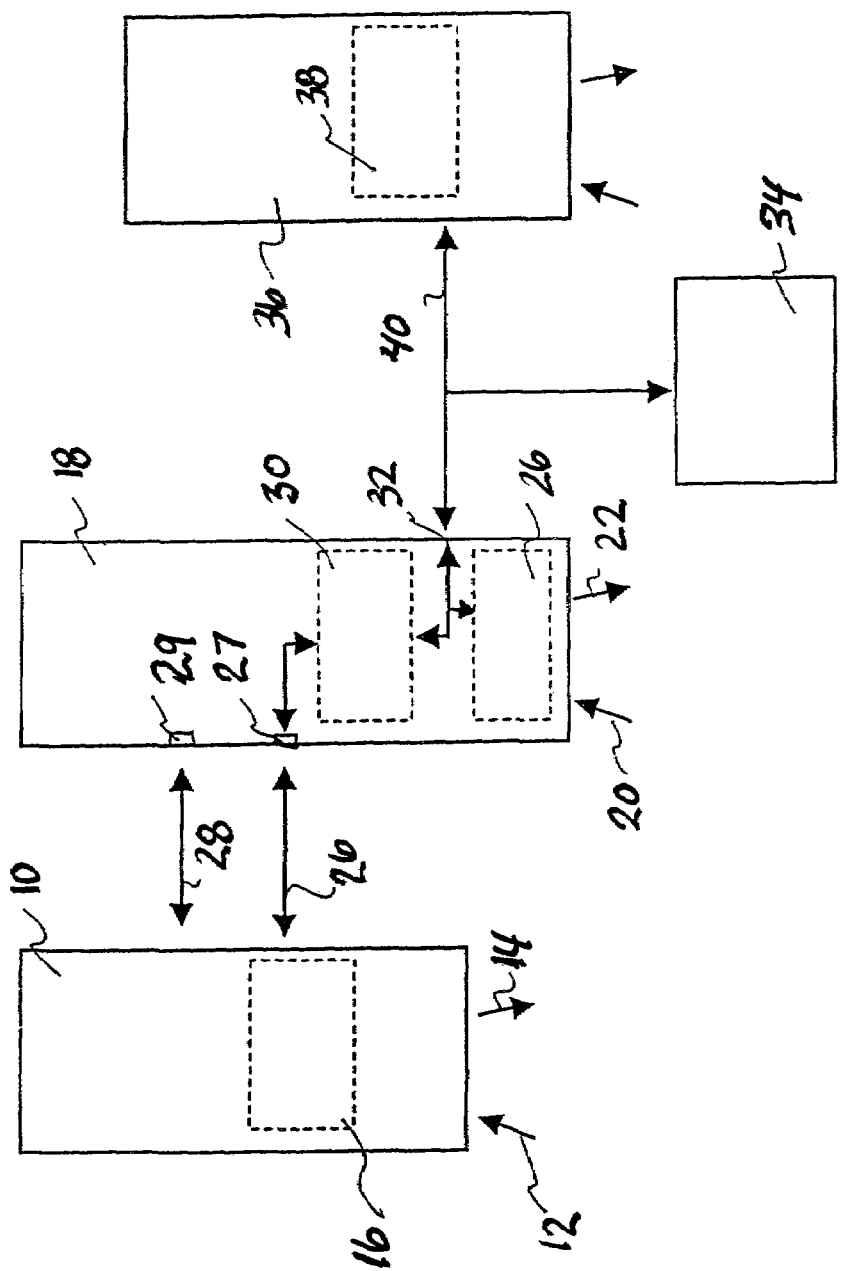
FIG. 1 shows three controllers with their connections and a diagnostic apparatus as a block diagram.

FIG. 1 shows a first controller 10 which forms part of a combustion engine, for example. The controller 10 receives measured values 12, processes them, and determines setpoints 14 therefrom for actuators of the controller. A self-diagnosing de-vice 16 is provided in the controller to detect any erroneous functions of one of the sensors or one of the actuators. A self-diagnosis of controllers has been known.

The second controller 18 which may be formed as a transmission control, for example, also receives data 20 from sensors and processes them into setpoints 22 for the actuators of the controller. The controller 18 is also equipped with a self-diagnosing apparatus 24.

Controllers 10 and 18 exchange data with each other via data lines 26 and 28. Data lines 26 and 28 open into interfaces 27 and 29, respectively, on the side where the second controller 18 is. What is generally understood by an interface hereinafter is a declaration on a data exchange, e.g. CAN (Controller Area Network). Interface 29 is designed as a rapid-action bus system for operating data of the vehicle, e.g. a CAN bus system. Diagnostic data and control commands for a diagnosis may be exchanged together with a protocol via the second interface 27.

The second controller 18 is provided with a translator 30 which translates diagnostic data arriving from of the first controller 10 via the interface 27 into the protocol of an interface 32 of the controller 18. The translated diagnostic data of the first controller 10 and the diagnostic data of the self-diagnosing apparatus 24 are applied to the interface 32 of the second controller 18. The data of the interface 32 may be read out by a diagnostic apparatus 34.

The diagnostic apparatus 34 also allows to apply data, which are meant for the self-diagnosing apparatuses 16 and 24, to the interface 32. For example, such data may be parameters for a diagnosis or commands to implement certain diagnostic procedures. The data of the diagnostic apparatus 34 is led directly to the first self-diagnosing apparatus 24 via the interface 32. As an alternative, the data is led on to the translator 30, from which place it is routed on to the selfdiagnosing apparatus 16 via the interface 27.

FIG. 1 also illustrates a third controller 36 the data of which is applied to the diagnostic apparatus 34 from a diagnostic apparatus 38 via the line 40.

Figure 2:
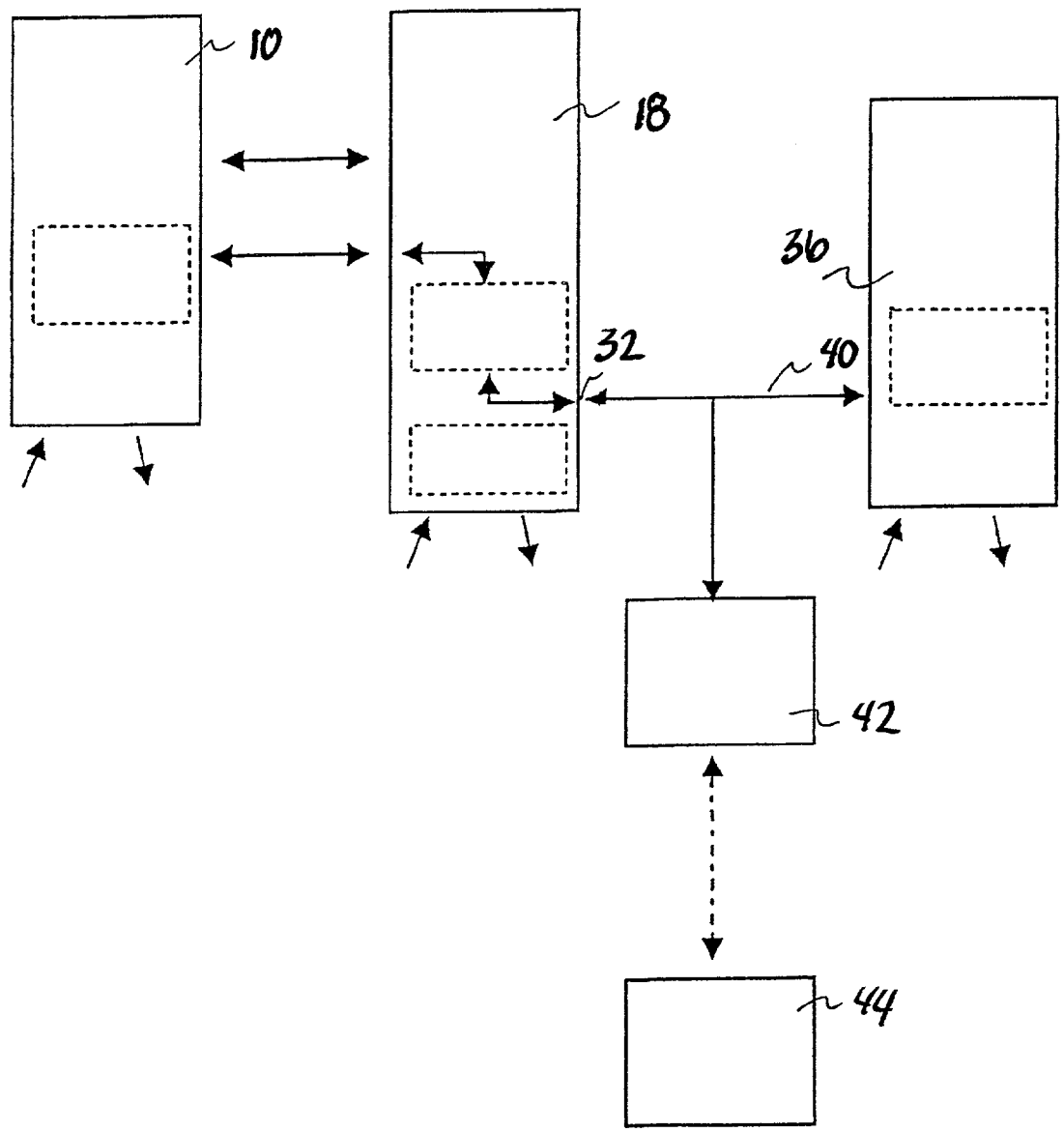
FIG. 2 shows three controllers with their connection lines and an external diagnostic apparatus as a block diagram.

FIG. 2 substantially shows the structure illustrated in FIG. 1 where like elements are designated by like reference numbers. In FIG. 2, interface 32 and data line 40 have connected thereto a communication module or transmission and reception unit 42 which exchanges data with a diagnostic apparatus 44, e.g. via radio or infrared light.

Figure 3:
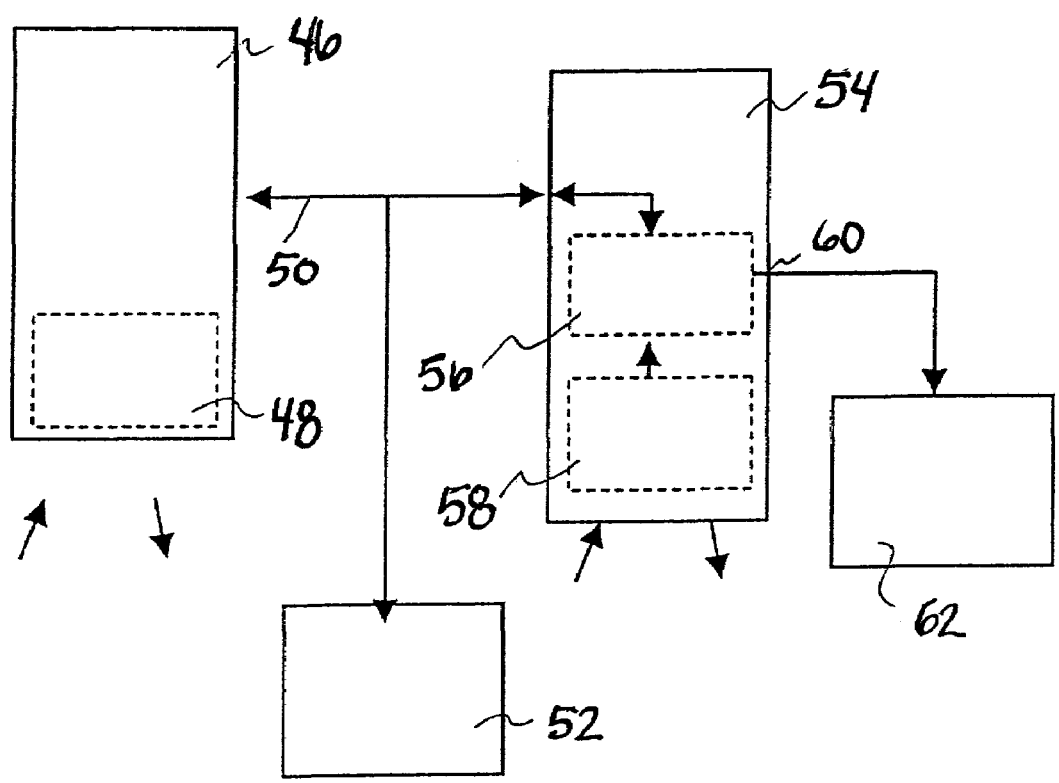
FIG. 3 shows two controllers each having two diagnostic apparatus according to the state of the art.

FIG. 3 shows the schematic structure in a conventional industrial truck. A first controller 46 is provided for a combustion engine, for example. The controller 46 carries out a self-diagnosis 48. Both the operating data and diagnostic data are exchanged via a data line 50. Now, if the diagnostic data of the first controller 46 is intended to be read out, a diagnostic apparatus 52 is required to be connected to the data link 50. This often necessitates connections and connectors specific to the controller and diagnostic apparatus suited for the protocol of the interface. The second controller 54 receives the operating and diagnostic data via the data line 50 and gains operating data from the data stream via an adaption module 56. The data of the self-diagnosis 58 is applied to an output 60 for the diagnostic apparatus 62. In the inventive method, in contrast, operating and diagnostic data is applied to the corresponding interface 32. This allows to connect further controllers and the diagnostic apparatus. Also, the transmission of operating and diagnostic data via the line 50 is effected via a common interface with a common protocol.

Using its adaption module, the controller 54 of FIG. 3 allows to employ simple diagnostic apparatus, e.g. on the basis of ISO-K, by the fact that the adaption module 56 translates the diagnostic data of the second controller 54 onto another interface with a specific protocol.

External diagnostic apparatus 34, 44, by providing appropriate commands to the interfaces, may activate diagnostic routines in the controllers by the fact that the external diagnostic apparatus outputs commands to the data line for vehicle data.

The additional communication module 42 of FIG. 2, which is coupled to the interface, permits to carry out a remote diagnosis. The communication module transmits and receives information and commands from the interface for the diagnostic apparatus. Such a remote diagnosis may be performed via ISDN, for example. The communication module may be a separate apparatus or may be integrated in the controller. The translation device may also be integrated in the controller or may be provided as a separate component.

The invention claimed is:

1. An industrial truck having a first and a second controller (10, 18) each of which has a device for a self-diagnosis (16, 30) of sensors (12, 20) and actuators (14, 22) of the controller, the second controller being provided with a first, a second, and a third interface (27, 29, 32) said industrial truck comprising:

a first and a second data line (26, 28) between the first and the second controller, the first data line (26) opens into said first interface (27) of said second controller, the second data line opens into said second interface (29) of said second controller designed as a rapid-action bus system, wherein the first data line is provided for diagnostic and control commands and the second data line is provided for operating data of the vehicle, wherein both controllers use a different protocol for its diagnostic data, and the second controller comprises a translation device to which the diagnostic data of the first controller via the first interface (27) are applied, said translation device translates the diagnostic data of the first controller into the protocol of the second controller and applies the translated data to said third interface (32) of the second controller, the diagnostic data of a self-diagnosis of the second controller are also applied to said third interface (32), and the third interface (32) is provided to be connected to a separate diagnostic apparatus reading diagnostic data from the first and the second controllers according to the protocol of the second controller.

2. The industrial truck as claimed in claim 1, characterized in that the interface (32) of the second controller (18) is a CAN interface.

3. The industrial truck as claimed in claim 1, characterized in that the translation device (30) has a processor which takes into account diagnostic data of the first controller in determining a setpoint for the first controller and translates them into error codes for the interface (32) of the second controller.

4. The industrial truck as claimed in claim 2, characterized in that the translation device (30) has a processor which takes into account diagnostic data of the first controller in determining a setpoint for the first controller and translates them into error codes for the interface (32) of the second controller.

5. The industrial truck as claimed in claim 1, characterized in that additional controllers are provided which are in communication with the interface of the second controller via data lines and which exchange operating and diagnostic data wherein an additional translation device is provided for each additional controller to translate the diagnostic data of the additional controllers for the interface of the second controller.

6. The industrial truck as claimed in claim 2, characterized in that additional controllers are provided which are in communication with the interface of the second controller via data lines and which exchange operating and diagnostic data wherein an additional translation device is provided for each additional controller to translate the diagnostic data of the additional controllers for the interface of the second controller.

7. The industrial truck as claimed in claim 3, characterized in that additional controllers are provided which are in communication with the interface of the second controller via data lines and which exchange operating and diagnostic data wherein an additional translation device is provided for each additional controller to translate the diagnostic data of the additional controllers for the interface of the second controller.

8. The industrial truck as claimed in claim 1, characterized in that the interface (32) of the second controller is designed to read in and output data for the first and additional controllers and the translation device translates the data into a protocol which is provided for the interface of the additional controller.

9. The industrial truck as claimed in claim 2, characterized in that the interface (32) of the second controller is designed to read in and output data for the first and additional controllers and the translation device translates the data into a protocol which is provided for the interface of the additional controller.

10. The industrial truck as claimed in claim 3, characterized in that the interface (32) of the second controller is designed to read in and output data for the first and additional controllers and the translation device translates the data into a protocol which is provided for the interface of the additional controller.

11. The industrial truck as claimed in claim 4, characterized in that the interface (32) of the second controller is designed to read in and output data for the first and additional controllers and the translation device translates the data into a protocol which is provided for the interface of the additional controller.

12. The industrial truck as claimed in claim 1, characterized in that the interface (32) of the second controller (18) has coupled thereto a transmission and reception unit (42).

13. The industrial truck as claimed in claim 2, characterized in that the interface (32) of the second controller (18) has coupled thereto a transmission and reception unit (42).

14. The industrial truck as claimed in claim 3, characterized in that the interface (32) of the second controller (18) has coupled thereto a transmission and reception unit (42).

15. The industrial truck as claimed in claim 5, characterized in that the interface (32) of the second controller (18) has coupled thereto a transmission and reception unit (42).

16. The industrial truck as claimed in claim 8, characterized in that the interface (32) of the second controller (18) has coupled thereto a transmission and reception unit (42).

17. A diagnostic system for an industrial truck of the type having a first and a second controller (10, 18) each of which has a device for a self-diagnosis (16, 30) of sensors (12, 20) and actuators (14, 22) of the controller, the second controller being provided with a first, a second, and a third interface (27, 29, 32), the diagnostic system comprising:
 a first and a second data line (26, 28) between the first and the second controller, the first data line (26) opens into said first interface (27) of said second controller, the second data line opens into said second interface (29) of said second controller designed as a rapid-action bus system, wherein the first data line is provided for diagnostic and control commands and the second data line is provided for operating data of the vehicle,
 wherein both controllers use a different protocol for its diagnostic data and the second controller includes a translation device to which the diagnostic data of the first controller via the first interface (27) are applied,
 wherein the translation device (30) translates the diagnostic data of the first controller (10) into the same protocol in which the diagnostic data (24) of the second controller is applied to the interface (32) and both the interface and protocol provide diagnostic and operating data suitable to communicate with additional controllers, and a separate diagnostic apparatus reads out the diagnostic data of all controllers via the interface (32) of the second controller (18).

18. The diagnostic system for an industrial truck as claimed in claim 17, characterized in that the interface (32) of the second controller (18) is a CAN interface.

19. The diagnostic system for an industrial truck as claimed in claim 17, characterized in that the translation device (30) has a processor which takes into account diagnostic data of the first controller in determining a setpoint for the first controller and translates them into error codes for the interface (32) of the second controller.

20. The diagnostic system for an industrial truck as claimed in claim 17, characterized in that additional controllers are provided which are in communication with the interface of the second controller via data lines and which exchange operating and diagnostic data where n an additional translation device is provided for each additional controller to translate tin diagnostic data of the additional controllers for the interface of the second controller.

21. The diagnostic system for an industrial truck as claimed in claim 17, characterized in that the interface (32) of the second controller is designed to read in and output data for the first and additional controllers and the translation device translates the data into a protocol which is provided for the interface of the additional controller.

22. The diagnostic system for an industrial truck as claimed in claim 17, characterized in that the interface (32) of the second controller (18) has coupled thereto a transmission and reception unit (42).

23. The diagnostic system as claimed in claim 17, further comprising a transmission and receipt on unit connected to a data line.

24. The diagnostic system as claimed in claim 23, characterized in that the interface (32) of the second controller (18) is a CAN interface.

25. The diagnostic system as claimed in claim 23, characterized in that the translation device (30) has a processor which takes into account diagnostic data of the first controller in determining a setpoint for the first controller and translates them into error codes for the interface (32) of the second controller.

26. The diagnostic system as claimed in claim 23, characterized in that additional controllers are provided which are in communication with the interface of the second controller via data lines and which exchange operating and diagnostic data wherein an additional translation device is provided for each additional controller to translate the diagnostic data of the additional controllers for the interface of the second controller.

27. The diagnostic system as claimed in claim 23, characterized in that the interface (32) of the second controller is designed to read in and output data for the first and additional controllers and the translation device translates the data into a protocol which is provided for the interface of the additional controller.

28. The diagnostic system as claimed in claim 23, characterized in that the interface (32) of the second controller (18) has coupled thereto a transmission and reception unit (42).

29. The diagnostic system as claimed in claim 23, characterized in that additional controllers are provided which are in communication with the interface of the second controller via data lines and which exchange operating and diagnostic data wherein an additional translation device is provided for each additional controller to translate the diagnostic data of the additional controllers for the interface of the second controller.

* * * * *

UNITED STATES PATENT AND TRADEMARK OFFICE
CERTIFICATE OF CORRECTION

PATENT NO.        : 7,089,098 B2                                                Page 1 of 1
APPLICATION NO.   : 10/268866
DATED             : August 8, 2006
INVENTOR(S)       : Andreas Rogg et al.

It is certified that error appears in the above-identified patent and that said Letters Patent is hereby corrected as shown below:

<u>Column 6, Claim 20</u>
Line 47, delete "where n" and insert --wherein--
Line 49, delete "tin" and insert --the--

<u>Column 6, Claim 23</u>
Line 62, delete "receipt on" and insert --reception--

Signed and Sealed this

First Day of May, 2007

JON W. DUDAS
*Director of the United States Patent and Trademark Office*